ELECTRIC MOTOR CONTROLLERS
Filed Sept. 4, 1956
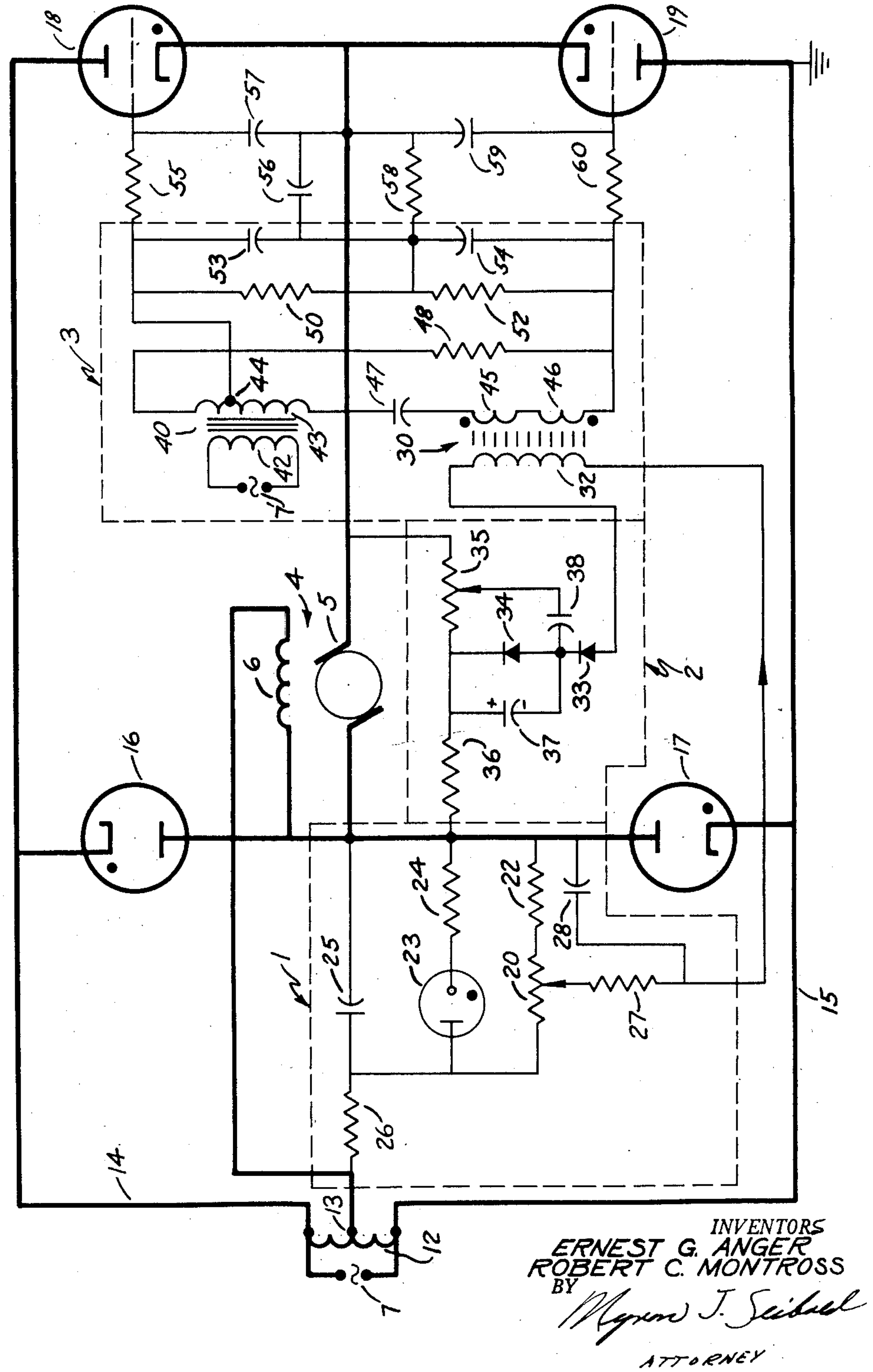
INVENTORS
ERNEST G. ANGER
ROBERT C. MONTROSS
BY
Myron J. Seibold
ATTORNEY United States Patent Office 2,899,620
Patented Aug. 11, 1959

2,899,620

ELECTRIC MOTOR CONTROLLERS

Ernest G. Anger, Wauwatosa, and Robert C. Montross, Thiensville, Wis., assignors to Square D Company, Detroit, Mich., a corporation of Michigan Application September 4, 1956, Serial No. 607,887
10 Claims. (Cl. 318—331)

The present invention relates to electric motor controllers and more particularly to electric motor controllers supplied from a rectified alternating current source.

Generally, the present embodiment of the invention is directed to circuit and apparatus for governing the electric power delivered to direct current motor from an alternating current supply source. The A.C. power source is coupled to the motor and converted to direct current by a rectifier circuit governing the flow of current through the motor windings.

The speed of the motor is controlled and regulated over a wide range by a feedback circuit using at least a portion of the field voltage as a reference which is regulated and compared to a portion of the armature voltage. A current sensitive means is included between the reference and armature to convert the error signal into means for controlling the current through the motor windings, said error signal being the difference between reference and armature feedback.

Compensation for the IR drop of the motor windings has been provided for in the feedback circuit by circuit means in series with the feedback circuit deriving a D.C. voltage from the ripple in the voltage on the motor windings, which is substantially proportional to the current and the voltage drop produced by the resistance of the motor windings.

The feedback circuit, therefore, provides a true error signal current which results from a comparison between a reference voltage and a motor winding voltage wherein the motor winding voltage has been compensated for voltages which do not produce useful power. Consequently, adjustment of the reference voltage will produce substantially linear changes in motor speed. It is an object, therefore, of the present invention to provide electric motor controllers with the foregoing features and advantages.

Another object is the provision of a circuit for producing a voltage which is proportional to current.

A further object of the invention is to provide a reactive circuit for compensating a feedback voltage from a load in proportion to losses of the load.

Still another object is the provision of a simplified circuit arrangement for controlling and supplying a motor from an alternating current source.

A further object is to provide a circuit for electric motor controllers in which the field provides a reference voltage source in a feedback circuit control arrangement.

Referring now to the drawing, the single figure shows a schematic diagram of a preferred embodiment of the electric motor controller of this invention.

The controller governs the power supplied to a motor 4 from an alternating current source 7 including a bridge circuit supplying D.C. power to the motor including diodes or unidirectional conducting devices 16 and 17 and grid controlled rectifiers or unidirectional conducting devices 18 and 19 in respective legs to govern the current supplied to the motor armature 5. A reactor 12 is connected across the A.C. source 7 and the field winding 6 of the motor 4 is supplied through the diodes 16 and 17 via tap 13 on the reactor. The supply lines 14 and 15 couple the diodes to the opposite ends of the source 7, the grid controlled rectifiers 18 and 19 control the flow of current during each alternating half cycle to the armature 5. The cathodes of the rectifiers 18 and 19 are connected to the center leg of the bridge including the armature 5 which is further connected to the diode branches of the bridge circuit.

The reference voltage circuit 1 is connected across the motor field winding 6 and coupled to the armature feedback circuit 2 through the control winding 32 of a saturable reactor 30. The reactor 30 is shown included in the phase shift control circuit 3 whose output signal is coupled to the grids of the rectifiers 18 and 19.

The reference voltage is derived from across the motor field 6 by the reference voltage circuit 1 which includes a potentiometer 20 connected to one side of the field winding through the voltage regulating resistor 26, and to the other side of the field through the minimum speed adjustment resistor 22. The two diametric diodes 16 and 17, having their plates connected to the midtap 13 of the reactor 12 through the motor field winding 6, provide a substantially constant D.C. voltage for the motor field and thus across the potentiometer 20. However, the voltage regulator tube 23 in series with the resistor 24 and in parallel with the filtering and dampening capacitor 25 provides regulation of the voltage across the potentiometer 20 and the series minimum speed adjustment resistor 22, thereby rendering the voltage more suitable for coupling to the feedback circuit 2 as a reference. A voltage dropping resistor 27 and a limiting capacitor 28 are connected in series between the tap of the potentiometer 20 and the plates of diodes 16 and 17 to limit inrush current during starting or abrupt changes in the speed setting of the potentiometer 20 by controlling the rate of change of the portion of reference voltage which is applied to the control winding of the phase shift reactor 30.

A compensated armature voltage feedback is provided by the voltage divider circuit including resistors 35 and 36 connected in series with each other across the armature 5 producing a feedback voltage at the junction therebetween which is coupled to the control winding 32 of the reactor 30 through the rectifiers 33 and 34 in series in the feedback output circuit to prevent the flow of reverse feedback current from the armature to the control winding 32. The resistor 35 forming part of the voltage divider across the armature 5 includes an adjustable voltage tap connected to the capacitor 38 thereby coupling a portion of armature voltage ripple to the junction of the rectifiers 33 and 34 for deriving a D.C. voltage which is reversed in polarity with respect to the portion of the armature voltage in the feedback circuit which is connected to the cathode of the rectifier 34.

The ripple voltage detector circuit includes the tap of the resistor 35 which couples an adjustable portion of the armature ripple voltage at a different potential level to the anode of the rectifier 34. The positive swing of the ripple voltage of the armature at the different potential level is coupled through the capacitor 38 and the rectifier 34 to the junction of the resistors 35 and 36. However, the negative swing of the ripple voltage is blocked by the rectifier 34 to produce a negative voltage on the plate of capacitor 38 which is divided by the capacitor divider network including the filter capacitor 37 and capacitor 38. The negative voltage derived from the ripple voltage provides a negative feedback and is substantially proportional to the amplitude of the armature voltage ripple which is in turn, proportional to the armature current. Placing this voltage in the output of the feedback circuit lowers the positive feedback voltage to compensate for the IR drop of the armature 5, whereby only the voltage across the armature which is indicative of speed is coupled to the feedback circuit output. Another means of coupling the ripple voltage to the feedback circuit is a transformer having a primary connected across a resistor having a different armature potential level than the feedback circuit and a secondary across the rectifier in the feedback circuit.

The phase shift circuit 3 is varied by the A.C. windings 45 and 46 of the reactor 30 which are connected in series opposition through the capacitor 47 to the tap of secondary 43 of the supply transformer 40. The primary of the transformer 40 is shown connected across the alternating current source 7' which may be the same as the source 7. In any case, the phase of the supply source 7' relative to the phase of the plate supply source 7 must be known to determine the necessary phase shift to control the rectifier 18 and 19. A resistor 48 is connected in series with the reactor windings 45 and 46 to complete the RL phase shift circuit. The RL circuit output is taken from the tap 44 and the junction of resistor 48 to winding 46 and coupled across a voltage divider including resistors 50 and 52. A resonating capacitor 47 is connected in series with the reactor windings 45 and 46 to increase the response of the phase shift circuit at higher armature voltages to compensate for the decreasing rate of the sinusoidal armature voltage supply where ignition of rectifiers occurs near the anode voltage peaks and the saturation curve of the reactor 30 drops off.

Filter capacitors 53 and 54 are connected across the resistors 50 and 52 respectively, of the voltage divider to bypass or suppress harmonics and voltage transients and shape the grid signal. Current limiting resistors 55 and 60 are connected in series with the output of the phase shift circuit coupling the circuit output to the grids of the rectifiers 18 and 19. A resistor 58 and capacitor 56 is connected in the grid to circuits of rectifiers 18 and 19 for producing a D.C. holdoff bias by grid rectification to correct the phase of the grid signal relative to the anode supply voltage and prevent firing of the rectifiers at the beginning of the positive swing of the anode supply voltage, particularly at the extreme phased back condition of the grid signal voltage. Capacitors 57 and 59 couple the respective grids and cathodes of the rectifiers 18 and 19 to provide a bypass filter for noise and voltage transients remaining in the grid signal.

In operation, the bridge rectifier circuit supplies direct current power to field and armature windings of the motor 4 wherein the diodes 16 and 17 supply a substantially constant field voltage with constant line input. This circuit may be a conventional center tap full wave rectifier supply circuit with the plates of the rectifiers connected through the field winding 6 to the center tap 13.

Since the voltage supplied to the field remains constant with constant line input, the field voltage may be used as a speed voltage reference regardless of the amount of conduction of the grid controlled tubes supplying the armature. The tapped reactor 12 need only have sufficient capacity for the required field power and, if the rectifiers need filament supply, the primary of the filament transformer may be tapped and used as a reactor if the primary winding is large enough to handle the field current in addition to its own load requirements.

The power to the motor armature 5 is controlled by varying the amount of conduction of the grid controlled rectifiers 18 and 19. The amount of armature voltage and therefore the speed can be controlled from zero to maximum voltage of the operating circuit. The control circuit for the controller includes the reference or speed voltage circuit 1, the feedback circuit 2 and the phase shift circuit 3. The reference voltage is fed to the feedback circuit where it is opposed by a portion of the armature voltage as determined by the divider ratios of the reference and feedback voltage circuits 1 and 2. The difference between the reference and armature feedback voltage, i.e., the error signal, produces a current through the control winding 32 of the reactor 30 causing a shift in phase of the voltage in the phase shift circuit which is proportional to the error signal current.

Current in the control winding 32 tends to saturate the reactor 30 and reduce the inductive reactive component of the windings 45 and 46 in the RL phase shift circuit. Decreasing the inductance of the phase shift circuit tends to phase ahead the output signal of the circuit at the tap 44 on the secondary of transformer 40 causing the tubes 18 and 19 to conduct earlier in the cycle and thereby to increase the voltage supplied to the armature 5.

The rectifiers 33 and 34 in the armature voltage feedback circuit limit the flow of current in one direction through the D.C. control winding 32 of the reactor 30 preventing runaway conditions during periods in which the current could reverse through the winding, particularly when the armature voltage exceeds the reference voltage. During normal operation, the current will flow through the reactor 30 when the reference voltage exceeds the armature feedback voltage. This will decrease the inductive reactance of the reactor 30 in proportion to the difference in voltages or error signal current. Increasing the reference voltage calling for an increase in speed tends to increase the error signal decreasing the inductive reactance of the reactor windings 45 and 46 in the RL circuit to phase ahead the grid signal, increase the armature voltage, and increase the speed, assuming the field voltage remains constant. In the same manner a decrease in speed produced by lowering the reference voltage decreases or cuts off the error signal current through the control winding 32 to increase the inductive reactance of the windings 45 and 46 phasing back the grid signal to reduce the voltage supplied to the motor amature 5.

The acceleration of the motor to full armature voltage speed due to a reference voltage setting at starting or during normal running may be controlled by introducing a delay in the reference voltage circuit by the RC network including the resistor 27 and capacitor 28 thus preventing excessive inrush currents in the motor armature winding.

The IR compensation network included in the armature feedback circuit provides for relatively constant speed regardless of the motor loading by rectification of armature voltage pulses or ripple. Since the ripple voltage present on the armature increases as a direct function of the armature current or motor load, the circuit including rectifier 34 and capacitor 38, in series with the reference voltage and the feedback circuit, provides a D.C. voltage, reversed in polarity, which is directly proportional to the magnitude of the armature ripple, causing the error signal to increase substantially in proportion to the amount of motor load regardless of the reference voltage setting.

The armature voltage ripple is at a different potential level than the feedback voltage tap and is transmitted through the capacitor 38 and rectifier 34 to produce a voltage whose polarity decreases the armature feedback voltage by an amount approximately proportional to the armature current. Since the percentage of armature resistance and inductance varies with different motors, the resistor 35 is made adjustable to control the amount of ripple voltage fed to the IR compensation circuit and therefore the compensating voltage applied to the feedback circuit.

Alternate methods of motor control will be apparent upon viewing the circuit; some of these may be mentioned and include: a half wave rectified supply in which only a single diode and grid controlled rectifier are used and the remaining full wave circuitry is eliminated; elimination of the diodes and providing a reactor 12 having a large enough capacity for the armature current and providing a separate field supply, or a series motor circuit providing a separate reference source and connecting the field in series with the armature; eliminating the tapped reactor or transformer and connecting the motor field directly across one of the diode rectifiers wherein the field would then be supplied with a half wave voltage with a back connected diode which would cause circulating current to flow in the motor during half cycles when the other diode was not conducting. However, in the latter circuit, connection of the field across the diode would produce half wave voltages of twice the peak magnitude and would produce a large A.C. line frequency component of field flux and therefore unbalanced counter E.M.F. in the feedback signal tending to unbalance the firing of the grid controlled rectifiers.

While certain preferred embodiments of the invention have been specificially disclosed, it is understood that the invention is not limited thereto, as many variations will be readily apparent to those skilled in the art and the invention is to be given its broadest possible interpretation within the terms of the following claims.

We claim:

1. In electric motor controllers supplying the motor armature from a rectified alternating current source, feedback circuit means connected to said armature including a unidirectional conducting device having one side connected to said armature for producing a feedback voltage proportional to the voltage supplied to said armature, compensating circuit means connected to said feedback circuit means and to said armature at a different potential level than said feedback circuit means to couple the ripple voltage superimposed on said armature voltage at said different potential level to the other side of said unidirectional conducting device whereby said feedback circuit is responsive to said coupled ripple voltage to produce a unidirectional voltage across said device proportional to said coupled ripple voltage component.

2. In motor controllers supplying the motor armature from a rectified alternating current source, feedback circuit means connected to said armature including a rectifier having a cathode connected to said armature for providing a negative feedback voltage proportional to the voltage supplied to said armature, compensating circuit means connected to said negative feedback circuit means and to said armature at a different potential level than said cathode to couple the ripple voltage, superimposed on said armature voltage at said different potential level, to the anode of said rectifier whereby said feedback circuit is responsive to said coupled ripple voltage to produce a unidirectional positive feedback voltage across said rectifier which is proportional to said coupled ripple voltage component.

3. In an electric controller for a motor having an armature supplied from a rectified alternating current source to provide a ripple voltage on said armature which is proportional to current flow through the armature, a feedback circuit including: a rectifier having an anode and a cathode with the cathode coupled to said armature for deriving a negative feedback voltage which is proportional to the armature voltage, circuit means responsive to the ripple voltage across the armature for producing a positive feedback voltage and thereby compensating said negative feedback voltage for variations in current in the armature, said circuit means comprising reactive circuit means arranged for coupling the ripple voltage on said armature at a potential level different from said negative feedback voltage level to the anode of said rectifier for providing a compensated feedback voltage at the anode which is proportional to motor speed.

4. In combination with electronic controllers for motors having an armature supplied from an alternating current source to provide a ripple voltage on said armature which is proportional to current flow through the armature, circuit means connected to said armature for deriving a feedback voltage output directly proportional to motor speed including a unidirectional device having an anode and cathode, said cathode being coupled to said armature and providing a first feedback potential on the cathode which is proportional to the armature voltage, and compensating circuit means including a reactance element connecting said anode to the armature at a second feedback potential for coupling said ripple voltage to said anode and providing amplitude in a positive feedback voltage between the anode and cathode which is directly proportional to armature current.

5. In combination with electronic controllers for motors having an armature supplied from an alternating current source for providing a ripple voltage on said armature which varies in proportion to current flow through the armature, circuit means connected to said armature for deriving a feedback compensating voltage directly proportional to armature current, said circuit means including a unidirectional device having two terminal connections wherein a first terminal is coupled to said armature for providing a negative feedback potential on said first terminal which is directly proportional to the armature voltage, and compensating circuit means including a reactance element connecting the second terminal of said device to the armature for coupling said ripple voltage to the second terminal, said device being arranged in the compensating circuit means so the ripple voltage will provide a positive feedback voltage across the terminals of said device in the non-conductive direction of said device.

6. In an electric controller for a motor having an armature winding supplied from rectified alternating current source, a reference voltage source, a feedback circuit including a unidirectional conducting device having a first side coupled to said armature winding and a second side coupled to said reference voltage source for deriving a positive armature feedback voltage and prevent current flow from said armature winding to said reference source, circuit means compensating said armature feedback voltage for armature winding voltage losses comprising reactive circuit means connected to said armature winding coupling a ripple voltage of higher potential level than said armature feedback voltage and directly proportional to armature winding voltage losses to the other side of said device whereby a compensating negative feedback voltage proportional to said ripple voltage is produced in the feedback circuit reducing the armature feedback voltage in proportion to the armature winding voltage losses.

7. An electronic motor control circuit for a motor having an armature winding and a field winding supplied from an alternating current source comprising, a first rectifier in series with said field and connected to said source to supply rectified alternating current to said field, controlled armature supply circuit means including a second rectifier in series with said armature having rectifier control means for controlling the current through said rectifier wherein said second rectifier is connected to said source for supplying controlled rectified alternating voltage to said armature, feedback circuit means coupled to said armature for deriving a voltage proportional to armature speed including a unidirectional conducting device having one side coupled to said armature for deriving a feedback voltage and reactive circuit means for coupling the armature ripple voltage at a different potential level than said unidirectional conducting device to the other side of said device to compensate the feedback voltage for losses in said motor, a regulated voltage source, variable reference voltage circuit means coupled to said regulated voltage source and to said feedback circuit means providing a range of voltages equal to the feedback voltages over the speed range of said motor, an error detector circuit means connected to said reference voltage circuit means and said feedback circuit means to produce a signal varying in magnitude as a function of the difference in said reference and feedback voltages and supplying said error signal to said rectifier control means to control the voltage supplied to said armature and the speed of said motor.

8. An electronic motor control circuit for a motor having an armature winding and a field winding supplied from an alternating current source comprising, a first rectifier in series with said field and connected to said source to supply rectified alternating current to said field, controlled armature supply circuit means including a second rectifier in series with said armature having rectifier control means for controlling the current through said rectifier wherein said second rectifier is connected to said source for supplying controlled rectified alternating voltage to said armature, feedback circuit means coupled to said armature for deriving a voltage proportional to armature speed including a unidirectional conducting device having one side coupled to said armature for deriving a feedback voltage and reactive circuit means for coupling the armature ripple voltage at a different potential level than said unidirectional conducting device to the other side of said device to compensate the feedback voltage for losses in said motor, variable reference voltage circuit means coupled to said field and to said feedback circuit means, said reference voltage circuit means providing a range of voltages equal to the feedback voltages over the speed range of said motor, an error detector circuit means connected to said reference voltage circuit means and said feedback circuit means to produce a signal varying in magnitude as a function of the difference in said reference and feedback voltages and supplying said error signal to said rectifier control means to control the voltage supplied to said armature and the speed of said motor.

9. An electronic motor control circuit for a motor having an armature winding and a field winding supplied from an alternating current source comprising, a reactor connected across said source, a full wave uncontrolled rectifier circuit connected to said source to supply full wave rectified alternating current to said field, controlled armature supply circuit means including a full wave grid controlled rectifier circuit connected to said source, a grid control circuit for controlling the rectifier current and rectified alternating voltage to said armature, feedback circuit means coupled to said armature for deriving a voltage proportional to armature speed including a rectifier having a cathode coupled to said armature for deriving a feedback voltage and a capacitor for coupling the armature ripple voltage at a different potential level than said cathode to the anode of said rectifier to compensate the feedback voltage for losses in said motor, a voltage source, variable reference voltage circuit means coupled to said voltage source and to said feedback circuit means providing a range of voltages equal to the feedback voltages over the speed range of said motor, and error detector circuit means connected to said reference voltage circuit means and said feedback circuit means to produce a signal varying in magnitude as a function of the difference in said reference and feedback voltages and circuit means coupling said error signal to said grid control circuit to control the voltage supplied to said armature and the speed of said motor.

10. In a controller for a D.C. motor having an armature energizable from a rectified A.C. voltage source; the combination comprising; a reference voltage signal source providing a reference voltage signal, controlling means responsive to the reference signal source for controlling the energization of the armature, feedback circuit means connected to the armature and controlling means and for providing a negative feedback voltage proportional to the voltage supplied to the armature, and compensating circuit means connected to the feedback circuit means and armature, said compensating circuit means being arranged to derive a positive D.C. voltage from the ripple in the rectified A.C. voltage across the armature which is proportional to current flow in said armature and for varying the reference voltage signal directly with the current flow through the armature for maintaining the speed of the motor constant independently of variations in load on the motor.

References Cited in the file of this patent

UNITED STATES PATENTS

| | | |
|---|---|---|
| 2,573,849 | Knauth et al. | Nov. 6, 1951 |
| 2,656,500 | Dee | Oct. 20, 1953 |

UNITED STATES PATENT OFFICE

CERTIFICATE OF CORRECTION

Patent No. 2,899,620 August 11, 1959

Ernest G. Anger et al.

It is hereby certified that error appears in the printed specification of the above numbered patent requiring correction and that the said Letters Patent should read as corrected below.

Column 6, line 9, after "providing" strike out "amplitude in".

Signed and sealed this 5th day of January 1960.

(SEAL)
Attest:

KARL H. AXLINE
Attesting Officer

ROBERT C. WATSON
Commissioner of Patents